United States Patent
Watabe (10) Patent No.: US 8,477,342 B2
(45) Date of Patent: Jul. 2, 2013

(54) REMOTE NETWORK ACCESS SYSTEM FOR GENERATING OUTPUT FROM SELECTED IMAGE PROCESSING APPARATUS IN A WAITING STATE IN RESPONSE TO OPERATION ON OPERATION SCREEN OF REMOTE ACCESS APPARATUS CONFORMED TO OPERATION SCREEN OF THE SELECTED IMAGE PROCESSING APPARATUS

(75) Inventor: Tatsuya Watabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 917 days.

(21) Appl. No.: 12/284,181

(22) Filed: Sep. 19, 2008

(65) Prior Publication Data

US 2009/0080023 A1 Mar. 26, 2009

(30) Foreign Application Priority Data

Sep. 21, 2007 (JP) ................................. 2007-244682

(51) Int. Cl.
*G06F 3/12* (2006.01)
(52) U.S. Cl.
USPC ........................................ 358/1.15; 358/1.13
(58) Field of Classification Search
None
See application file for complete search history.

(56) References Cited

U.S. PATENT DOCUMENTS

| 2001/0007138 | A1 | 7/2001 | Iida et al. | |
| 2001/0055492 | A1* | 12/2001 | Wood et al. | 399/8 |
| 2003/0212783 | A1 | 11/2003 | Sakai | |
| 2003/0231331 | A1* | 12/2003 | Tanaka | 358/1.13 |
| 2006/0293765 | A1* | 12/2006 | Tanaka et al. | 700/15 |
| 2008/0013109 | A1* | 1/2008 | Chen et al. | 358/1.1 |

FOREIGN PATENT DOCUMENTS

| CN | 1812568 A | 8/2006 |
| JP | 05-122424 | 5/1993 |
| JP | 11-249503 | 9/1999 |
| JP | 2000-78169 | 3/2000 |
| JP | 2001-183759 | 1/2001 |
| JP | 2003-323364 | 11/2003 |
| JP | 2007-115039 | 5/2007 |

OTHER PUBLICATIONS

The Official Action issued by the Chinese Patent Office for Chinese Patent Application No. 200810145199.1 dated Jun. 24, 2011.

* cited by examiner

*Primary Examiner* — Ming Hon
(74) *Attorney, Agent, or Firm* — Edwards Wildman Palmer LLP; David G. Conlin; David A. Tucker (57) ABSTRACT

A plurality of image processing apparatuses 1 and a remote access apparatus 2 which remotely operates each image processing apparatus 1 are connected through a network 3. Each image processing apparatuses 1 have a same operation screen. The remote access apparatus 2 accesses the plurality of image processing apparatuses 1, and acquires screen data for displaying an operation screen A, from one of the image processing apparatuses 1. The remote access apparatus 2 displays the same operation screen A as the operation screen of the image processing apparatus 1. When a user performs an operation for outputting reports on this operation screen A, the remote access apparatus 2 requests output from each image processing apparatus 1. Each image processing apparatus 1 creates a report and transmits it to the remote access apparatus 2. Therefore, it is possible to acquire reports about the conditions of the plurality of image processing apparatuses outputted from the plurality of image processing apparatuses by one operation.

6 Claims, 6 Drawing Sheets

REMOTE NETWORK ACCESS SYSTEM FOR GENERATING OUTPUT FROM SELECTED IMAGE PROCESSING APPARATUS IN A WAITING STATE IN RESPONSE TO OPERATION ON OPERATION SCREEN OF REMOTE ACCESS APPARATUS CONFORMED TO OPERATION SCREEN OF THE SELECTED IMAGE PROCESSING APPARATUS

BACKGROUND OF THE INVENTION

1. Field of the Invention

The present invention relates to a remote access system for remotely operating a plurality of image processing apparatuses connected to a remote access apparatus via a network.

2. Description of the Related Art

Conventionally, in order to remotely operate an image processing apparatus, an information processing apparatus, such as a computer, connected to the image processing apparatus via a network displays HTML information stored in the image processing apparatus using a WWW browser. By performing an operation on the screen using a displayed user interface, a user can control the image processing apparatus from the information processing apparatus.

There is a remote access system using a well-known application such as VNC (Virtual Network Computing). An image processing apparatus on the server side transmits screen data to an information processing apparatus on the client side. The information processing apparatus displays an operation screen on the basis of the screen data. Operation information when an operation is performed with a keyboard, a mouse or the like is transmitted to the image processing apparatus, and the image processing apparatus is remote-controlled. Such a remote access system is disclosed, for example, in Japanese Patent Laid-Open No. 2007-115039.

In the remote access system as described above, the information processing apparatus can acquire various reports about the conditions of the image processing apparatus, such as a job history, an error history, a communication history and a counter, from the image processing apparatus by performing a remote operation.

However, in the case of using a WWW browser, the description on the screen is in HTML, and the screen is different from the operation screen of the image processing apparatus. Therefore, a user cannot perform an operation as he does on the operation screen of the image processing apparatus, and there is a possibility that the user is confused about how to perform an operation.

Furthermore, in the case of using VNC, it is possible to operate only one image processing apparatus by one operation. In order to acquire reports from a plurality of image processing apparatuses, the information processing apparatus has to repeatedly perform the same operation for each of the image processing apparatuses. As described above, in the case of acquiring reports from a plurality of image processing apparatuses, an excessive burden is imposed on the user. Therefore, improvement of the operability is needed.

In response to a request from the information processing apparatus, the image processing apparatus creates a report and outputs it by printing on paper. Therefore, the user has to go to each image processing apparatus to go for the report. Even if a report is outputted by a remote operation, it takes much time to acquire it, and the merit of the remote access system cannot be enjoyed.

In view of the above situation, the object of the present invention is to provide a remote access system capable of acquiring reports outputted from plurality of image processing apparatuses by one operation.

SUMMARY OF THE INVENTION

The present invention is a remote access system in which a plurality of image processing apparatuses for processing an image and a remote access apparatus for remotely operating the image processing apparatuses are connected via a network, and the remote access apparatus displays the same operation screen as the operation screens of the image processing apparatuses and remotely operates the image processing apparatuses on the basis of an operation on this operation screen. The remote access apparatus accesses a plurality of image processing apparatuses and requests output on the basis of an operation for outputting reports on the operation screen, and each image processing apparatus creates a report in response to the output request from the remote access apparatus.

That is, the remote access apparatus is provided with a display section for displaying the same operation screen as the operation screens of the image processing apparatuses and a remote control section for remotely operating the image processing apparatuses in response to an operation on this operation screen; and the remote control section accesses a plurality of image processing apparatuses, and, when an operation for output of reports is performed on the operation screen, requests output of a report from each image processing apparatus.

By a user performing an operation on the same operation screen as the operation screens of the image processing apparatuses, the remote access apparatus remotely operates the plurality of image processing apparatuses at a time. Thereby, it is possible to acquire reports from the plurality of image processing apparatuses.

The image processing apparatuses have a common operation screen, and the remote access apparatus selects one image processing apparatus from among the plurality of image processing apparatuses and acquires screen data to be displayed on the operation screen, from the image processing apparatus. Since the plurality of image processing apparatuses have the same operation screen, it is sufficient to acquire screen data from one image processing apparatus. The user does not have to perform the same operation many times.

The image processing apparatuses transmit the reports to a specified storage destination in the network. Since the reports are outputted to the specified storage destination, the user does not have to collect reports from the image processing apparatuses.

The remote access apparatus determines image processing apparatuses from which the remote access apparatus requests output of reports this time, on the basis of the last time acquisition of reports. It becomes easier to search for image processing apparatuses to be targeted in the case of periodically collecting reports, and the work efficiency can be improved.

The image processing apparatuses set the operation screen to an initial state when being accessed by the remote access apparatus. The remote access apparatus acquires the screen data of the current operation screen. Therefore, if an image processing apparatus is executing processing, the operation screen during the operation being performed is displayed. There is a possibility that, by performing a remote operation by mistake, the processing being executed on the image processing apparatus may be interrupted. If the initial-state operation screen is displayed, such a wrong operation can be prevented from being performed.

The remote access apparatus gives an event notification to each image processing apparatus in response to an operation on the operation screen, and each image processing apparatus performs the same processing on the basis of the event notification. The image processing apparatuses can create and output a report by only one remote operation.

According to the present invention, it is possible to acquire reports from image processing apparatuses by one operation, by displaying the same operation screen as those of the plurality of image processing apparatuses. It is not necessary for a user to perform an operation for each image processing apparatus. Thus, the time and trouble for outputting the reports can be saved, and the operability can be improved.

DETAILED DESCRIPTION OF THE PREFERRED EMBODIMENTS

Figure 1:
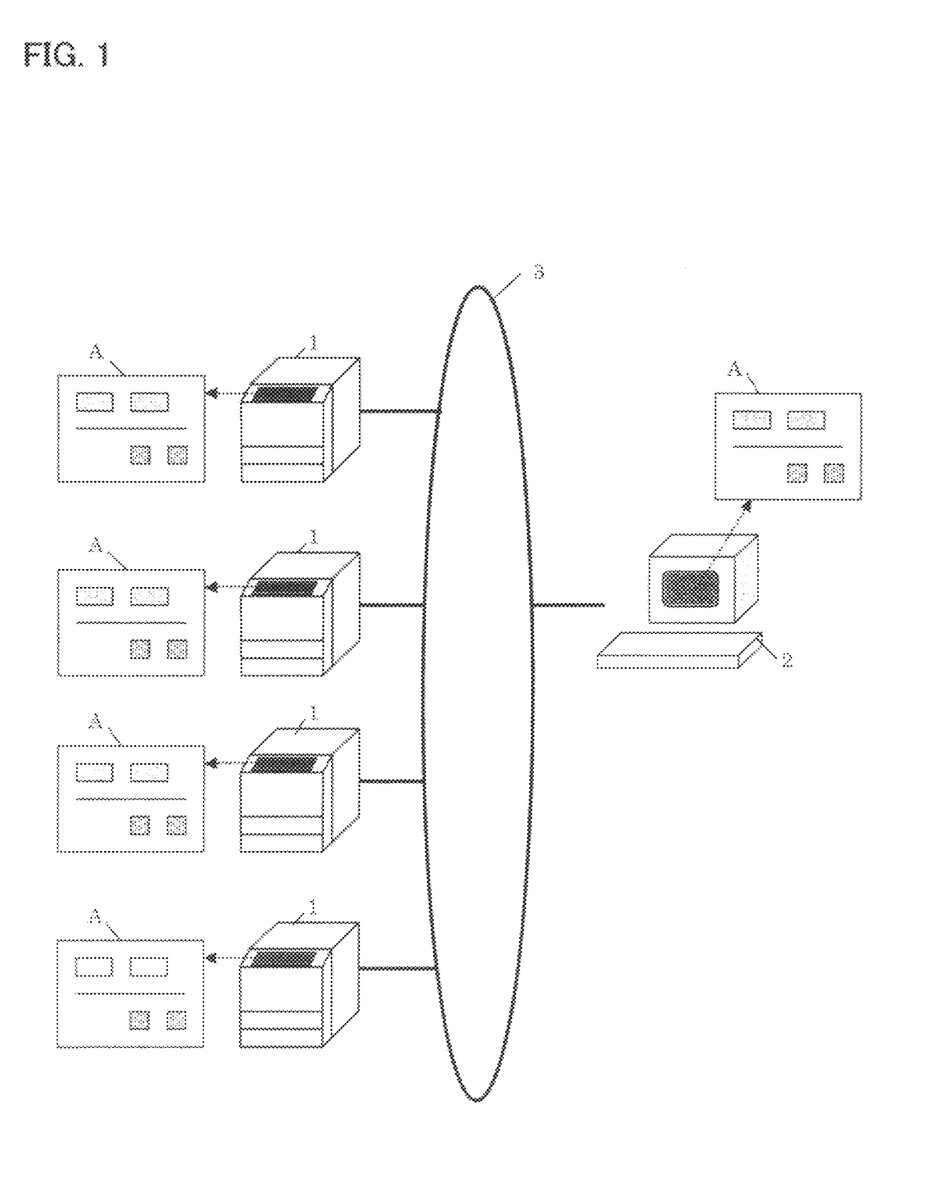
FIG. 1 is a diagram showing the schematic configuration of a remote access system of the present invention.

The remote access system of this embodiment is shown in FIG. 1. In the remote access system, a plurality of image processing apparatuses 1 and a remote access apparatus 2 are communicably connected through a network 3. The network 3 is a LAN, a WAN, the Internet or the like.

Figure 2:
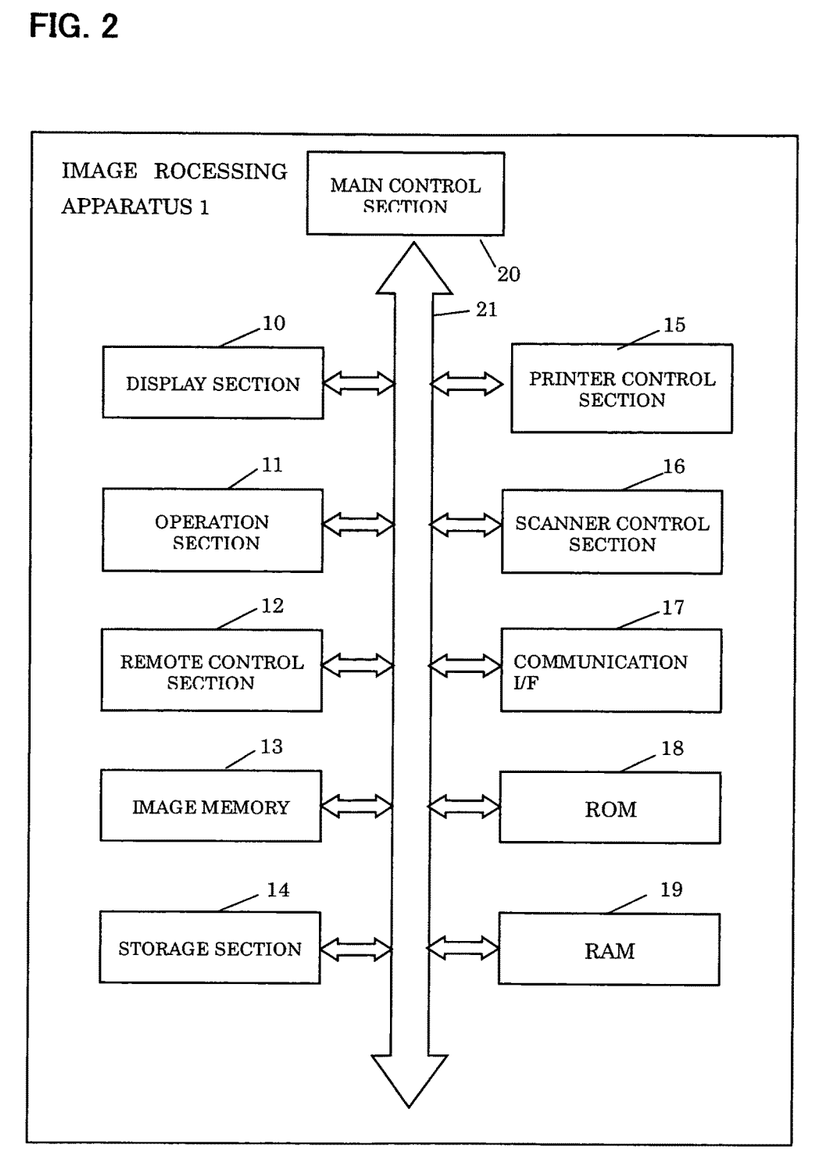
FIG. 2 is a control block diagram of an image processing apparatus.

The image processing apparatus 1 is an MFP which executes processings such as copying, printing, scanning, facsimile communication and document filing. As shown in FIG. 2, the image processing apparatus 1 is provided with a display section 10, an operation section 11, a remote control section 12, an image memory 13, a storage section 14, a printer control section 15, a scanner control section 16, a communication I/F 17, a ROM 18, a RAM 19 and a main control section 20, and these are connected with one another via an I/O bus 21.

The display section 10 is a display such as a CRT and an LCD. The display section 10 is provided with a touch panel, and an input operation can be performed on the screen. The operation section 11 is hardware keys and switches, an externally connected keyboard, or the like. The remote control section 12 is a control section for exchanging information with the remote access apparatus 2, and it communicates data with the remote access apparatus 2 through the network 3 from the communication I/F 17. The image memory 13 is a display memory, which stores image information to be displayed on the display section 10. The storage section 14 is configured by a hard disk apparatus and a readable/writable non-volatile memory, and it stores image data and various information. The printer control section 15 drives a printer for printing an image. The scanner control section 16 drives a scanner for reading the image of a document. The communication I/F 17 transmits and receives data to and from other image processing apparatuses 1 and the remote access apparatus 2 through the network 3. The ROM 18 stores a control program for causing the image processing apparatus 1 to operate. The RAM 19 is a work memory for temporarily storing data. The main control section 20 is configured by a CPU, and it controls the entire image processing apparatus 1.

The plurality of image processing apparatuses 1 display the same operation screen A on their display sections 10 as shown in FIG. 1. That is, it is possible to perform processing such as copying in the same operation procedure on each image processing apparatus 1.

Figure 3:
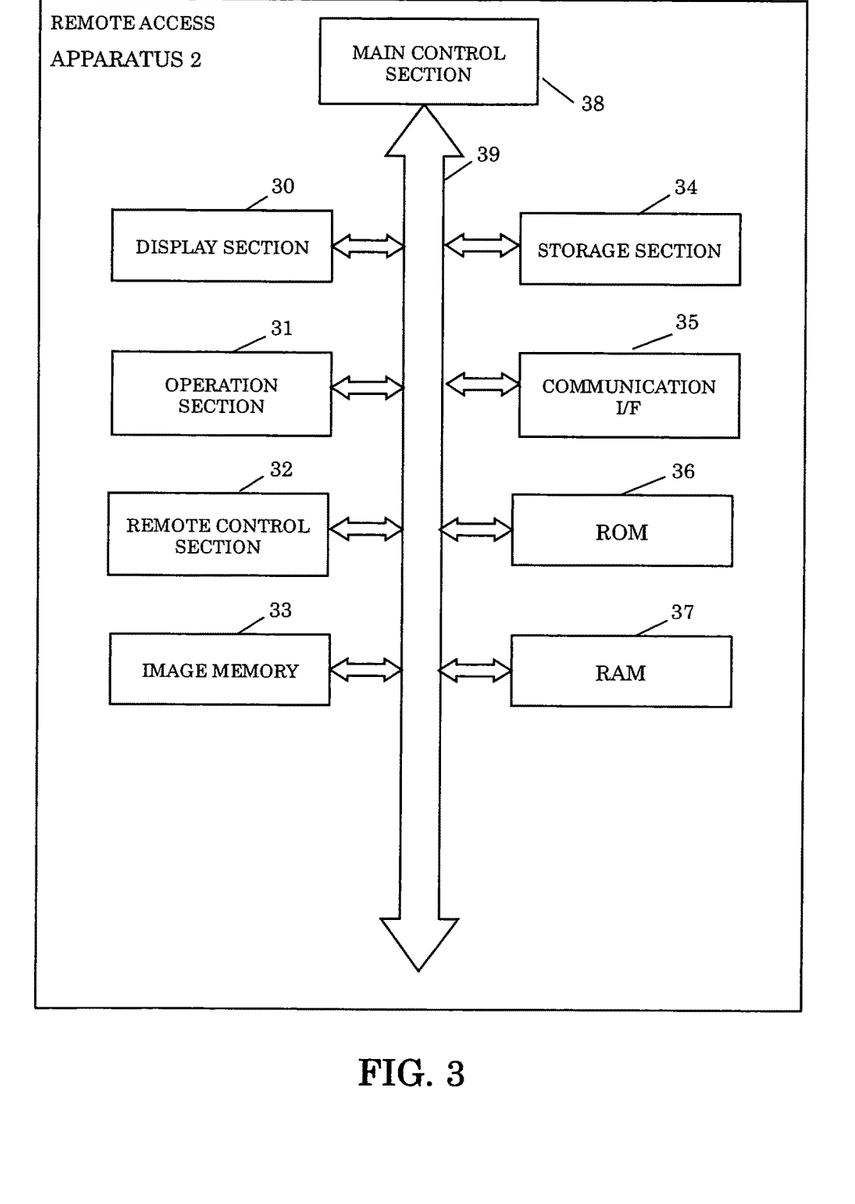
FIG. 3 is a control block diagram of a remote access apparatus.

As shown in FIG. 3, the remote access apparatus 2 is provided with a display section 30, an operation section 31, a remote control section 32, an image memory 33, a storage section 34, a communication I/F 35, a ROM 36, a RAM 37 and a main control section 38, and these are connected with one another via an I/O bus 39. Though the remote access apparatus 2 is a common information processing apparatus such as a personal computer, it has a function for remotely operating the plurality of image processing apparatuses 1 at the same time. That is, by executing a remote operation program, the remote control section 32 accesses the plurality of image processing apparatuses 1, performs data communication with the image processing apparatuses 1, and remotely operates each of the image processing apparatuses 1.

Accordingly, as shown in FIG. 1, when acquiring the screen data of the operation screen A from the image processing apparatus 1, the remote access apparatus 2 displays the same operation screen A as the operation screen A of the image processing apparatus 1 on the display section 30. Thus, when accessing a plurality of image processing apparatuses 1 specified by a user, the remote access apparatus 2 acquires screen data from one of the image processing apparatuses 1 and displays the operation screen A. It is not necessary for the remote access apparatus 2 to acquire screen data from all the image processing apparatuses 1.

Figure 4:
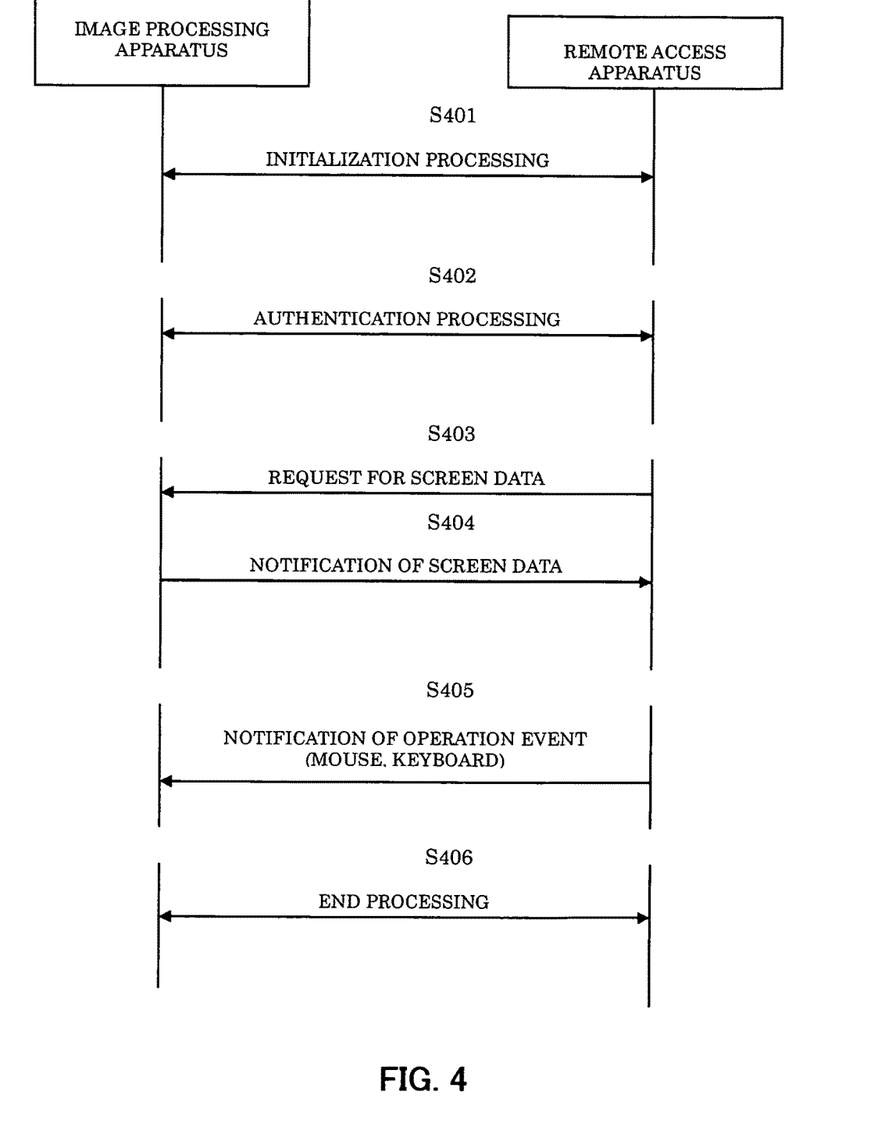
FIG. 4 is a diagram showing a command sequence of a remote operation.

Now, a procedure for remote access apparatus 2 remotely operating the image processing apparatus 1 will be described. As shown in FIG. 4, a commands are sent and received between the remote control section 32 of the remote access apparatus 2 and the remote control section 12 of the image processing apparatus 1. At first, the image processing apparatus 1 is in a state that it is not accessed by the remote access apparatus 2, and it is in a state of waiting for access. First, the remote access apparatus 2 accesses the image processing apparatus 1 and establishes connection. Then, initialization processing is performed at S401, and next, authentication processing is performed at S402.

In the initialization processing, the operation screen of the image processing apparatus 1 is returned to an initial state. In the authentication processing, the remote control section 12 of the image processing apparatus 1 judges whether or not to permit an operation, on the basis of authentication information transmitted from the remote access apparatus 2. In the case of not permitting an operation, the remote control section 12 performs end processing and cuts the connection with the remote access apparatus 2.

When permitting an operation, the image processing apparatus 1 waits for the next command. At S403, the remote control section 32 of the remote access apparatus 2 requests the screen data of the operation screen. At S404, in response to this request, the remote control section 12 of the image processing apparatus 1 transfers the screen data. The screen data is bitmap screen data. Here, when the screen data is transmitted, it may be compressed or encrypted.

A user performs an input operation on the operation screen of the remote access apparatus 2. At S405, the remote control section 32 of the remote access apparatus 2 gives an operation event notification to the image processing apparatus 1. An operation event occurs when an operation by a mouse or an operation by a keyboard is performed. This notification includes operation information such as coordinate information of a pointer, information about press of a button and information about press of a key.

In the image processing apparatus 1, a specified operation is performed in accordance with the operation event notification. If an internal error occurs, a communication error occurs, or an end instruction is given by the user, end processing is performed at S406, and the connection is cut.

Figure 5:
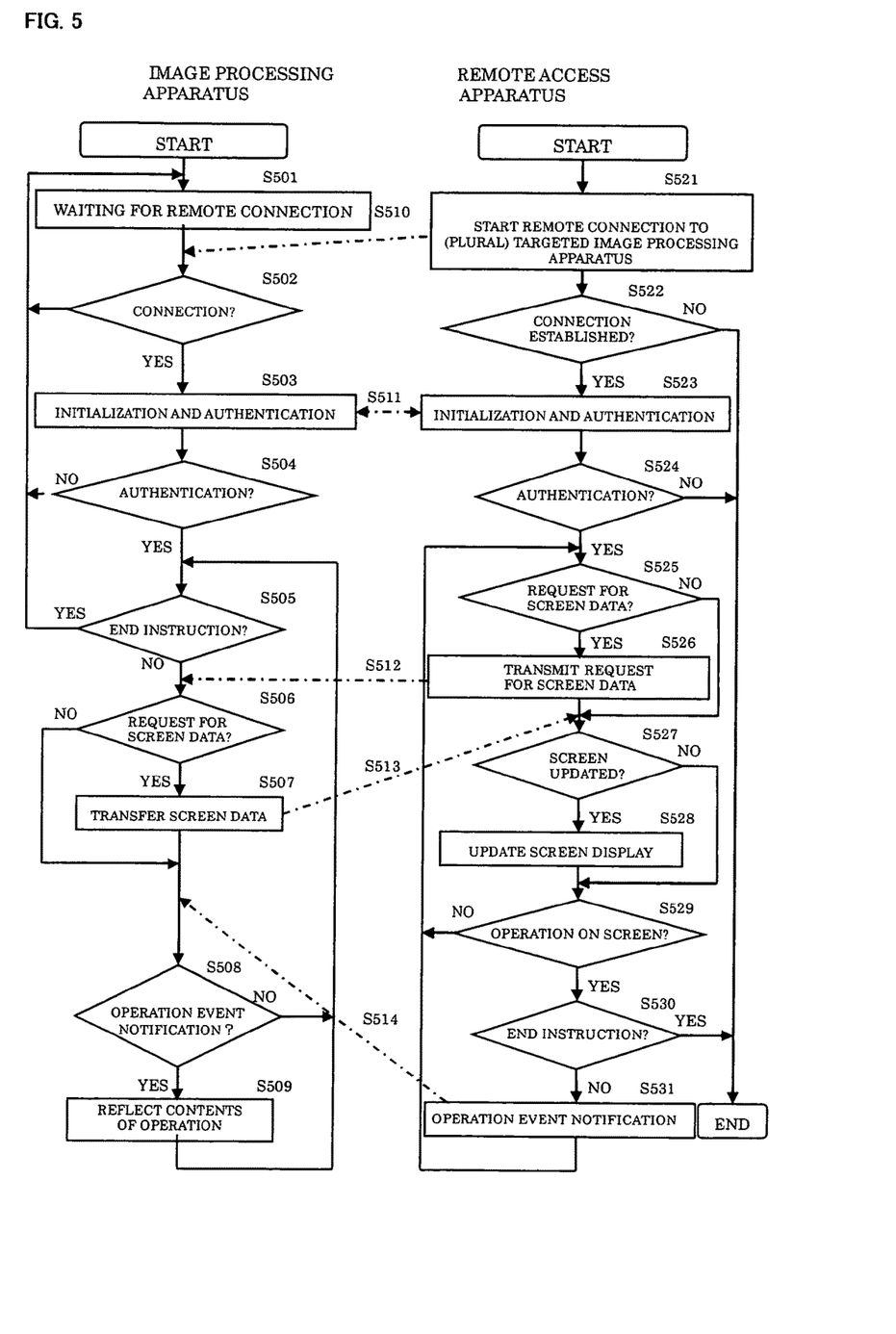
FIG. 5 is a flowchart at the time when a remote operation is performed, in the image processing apparatus and the remote access apparatus.

Here, the operation of each apparatus will be described in detail in accordance with FIG. 5. In the image processing apparatus 1, the remote control section 12 waits for connection from the outside at S501. At S502, when receiving a connection request of S510, the remote control section 12 judges whether the connection is remote connection by access from the remote access apparatus 2. If it is not the remote access, the image processing apparatus 1 continues to wait for access from the remote access apparatus 2.

When confirming that the access is from the remote access apparatus 2, the remote control section 12 establishes connection with the remote access apparatus 2. At S503, initialization processing and authentication processing are performed.

In the initialization processing, the main control section 20 controls the display section 10 to display an initial-state operation screen. In the authentication processing, the remote control section 12 judges whether or not to permit the remote operation on the basis of received authentication information at S504. That is, the remote access apparatus 2 transmits the authentication for identifying itself to the image processing apparatus 1 at S511. Receiving this authentication information, the remote control section 12 of the image processing apparatus 1 checks it against authentication information about the remote access apparatus 2 registered in advance. When confirming that the authentication information is the registered authentication information, the remote control section 12 of the image processing apparatus 1 permits the remote operation. When confirming that the authentication information does not correspond to the registered authentication information, the remote control section 12 refuses the remote operation. In the case of not permitting the remote operation, the remote control section 12 performs end processing and cuts the connection with the remote access apparatus 2, and waits for a connection request again at S501.

When having authenticated the remote access apparatus 2, the remote control section 12 checks whether or not there is an end instruction by the user at S505. If there is an end instruction, the remote control section 12 performs the end processing and returns to S501.

If there is not an end instruction, the remote control section 12 checks whether or not there is a request for screen data from the remote access apparatus 2 at S506. The remote access apparatus 2 requests screen data at S512. In response to this request, the remote control section 12 transfers the screen data of the operation screen in an initial state at S507. After that, the remote control section 12 checks whether or not there is an operation event notification from the remote access apparatus 2 at S508. If there is not an operation event notification, the remote control section 12 returns to S505 and waits for a command from the remote access apparatus 2.

The remote access apparatus 2 performs an operation event notification at S514. When receiving this notification, the remote control section 12 of the image processing apparatus 1 acquires operation information from the operation event notification and outputs it to the main control section 20. At S509, the main control section 20 performs specified control in accordance with the operation information to reflect the contents of the user's operation. Furthermore, it updates the operation screen.

On the other hand, in the remote access apparatus 2, the remote control section 32 accesses to the image processing apparatus 1 to be a target of the remote operation and starts connection at S521. Therefore, the remote access apparatus 2 makes a connection request to the image processing apparatus 1 at S510. At S522, when connection with the image processing apparatus 1 cannot be established, the remote control section 32 ends the remote operation.

When connection is established, the remote control section 32 performs initialization processing and authentication processing at S523. In the initialization processing, the image memory 33 is cleared. In the authentication processing, the remote control section 32 transmits authentication information to the image processing apparatus 1 at S511. When having authenticated the remote access apparatus 2, the image processing apparatus 1 notifies permission of the remote operation. At S524, the remote control section 32 of the remote access apparatus 2 confirms whether there is a permission notification or not. When the image processing apparatus 1 cannot authenticate the remote access apparatus 2, it notifies refusal. Receiving this notification, the remote control section 32 ends the remote operation.

When receiving a permission notification, the remote control section 32 of the remote access apparatus 2 requests screen data from the image processing apparatus 1 to display the operation screen of the image processing apparatus 1 at S525 and S526. If the same operation screen as the operation screen of the image processing apparatus 1 is already displayed, the remote control section 32 does not request the screen data.

When the image processing apparatus 1 transmits screen data in response to the request, the remote control section 32 of the remote access apparatus 2 stores the received screen data in the image memory 33. The main control section 38 controls the display section 30 to display an operation screen on the basis of the screen data. When the operation screen is already displayed, the main control section 38 confirms whether the operation screen has been updated at S527 and S528. If the operation screen has been updated, the main control section 38 updates display of the operation screen.

Here, the remote control section 32 monitors whether or not there is a user operation on the operation screen at S529. When the user performs an operation on the operation screen, the remote control section 32 confirms whether the user's operation is an end instruction at S530. If the user's operation is an end instruction, the remote control section 32 performs end processing.

If the user's operation is not an end instruction, the remote control section 32 gives an operation event notification to the image processing apparatus 1 at S531. Then, the remote control section 32 returns to S525. After that, each time the user performs an operation, the steps S525 to S531 are repeated, and the operation screen of the remote access apparatus 2 changes according to the operation of the image processing apparatus 1.

Since the plurality of image processing apparatuses 1 have the same operation screen, the remote access apparatus 2 can remotely operate the image processing apparatuses at the same time. In this case also, the commands described above are sent and received between the remote access apparatus 2 and each of the image processing apparatuses 1. Therefore, by the remote access apparatus 2 performing one remote operation, the image processing apparatuses 1 perform the same processing. However, when the remote access apparatus 2 acquires an operation screen, commands are sent and received between the remote access apparatus 2 and one selected image processing apparatus 1, and the remote access apparatus 2 receives screen data from this image processing apparatus 1.

The remote access apparatus 2 collects status reports about the conditions of the image processing apparatuses 1, such as job histories, error histories, communication histories, counters and the state of consumables. The user performs an operation for outputting the reports on the operation screen of the image processing apparatus 1 displayed on the remote access apparatus 2. The remote control section 32 of the remote access apparatus 2 gives operation event notifications about a series of operations performed for outputting the reports, to the plurality of image processing apparatuses 1.

At this time, the remote control section 32 stores the operation procedure the user performed to output the reports and registers it as a report output job. When the user specifies the report output job at the time of performing a remote operation, the remote control section 32 automatically executes the operation in accordance with the operation procedure. Therefore, the user does not have to perform the complicated operation, and the operability can be improved.

Figure 6:
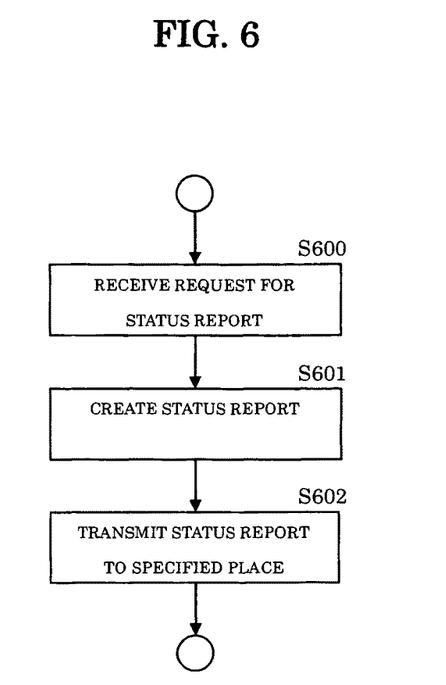
FIG. 6 is a flowchart when a report is outputted from the image processing apparatus.

As shown in FIG. 6, by receiving the notification, the remote control section 12 of each image processing apparatus 1 accepts the request for output of a status report at S600. Then, at S601, the main control section 20 creates a status report. The status report is created as data in a predetermined format, for example, as text data. At S602, the remote control section 12 transmits the status report to a specified storage destination. As the transmission method, communication protocols, such as FTP and HTTP, are used.

The destination to store the status report is the storage section 34 of the remote access apparatus 2. When giving an operation event notification, the remote access apparatus 2 specifies a storage destination. A management server connected to the network 3 or a particular image processing apparatus 1 may be specified as the storage destination.

The status report is stored in the storage destination. Then, the status report is outputted as necessary by being printed or displayed on the screen.

As described above, the user can acquire necessary reports from a plurality of image processing apparatuses 1 at the same time by one operation. The user can collect the electronized reports at hand and save time to go and collect the outputted reports.

The remote control section 32 of the remote access apparatus 2 determines image processing apparatuses 1 from which it requests output of reports this time, on the basis of the reports acquired last time. Generally, reports are periodically collected to manage the image processing apparatuses 1. Therefore, such image processing apparatuses 1 that a predetermined period, for example, one month has passed since the last report acquisition time are targeted by the request for output of reports. The remote control section 32 searches for image processing apparatuses 1 to be targeted, from among the plurality of image processing apparatuses 1 in accordance with the search condition, and requests output of reports from appropriate image processing apparatuses 1.

In a remote access system, image processing apparatuses 1 of different models may be mixed. In the case of image processing apparatuses of the same model, they have the same operation screen. However, the operation screens may be different among different models. When the remote access apparatus 2 collects reports from image processing apparatuses 1 connected to the network 3, the remote control section 32 searches for image processing apparatuses 1 having the same operation screen for grouping. For example, the remote control section 32 groups the image processing apparatuses 1 on the basis of their models. The plurality of image processing apparatuses 1 belonging to one group have the same operation screen. Then, for each group, the remote control section 32 requests output of reports. Therefore, a user performs an operation the number of times according to the number of groups.

The remote access apparatus 2 selects one image processing apparatus 1 from which the screen data of the operation screen is to be acquired, from among the plurality of image processing apparatuses 1. That is, the remote control section 32 inquires of the image processing apparatuses 1 about their current operation state, and searches for image processing apparatuses 1 which are in a waiting state and not operating, on the basis of responses from the image processing apparatuses 1. Then, the remote control section 32 selects one image processing apparatus 1 from among the image processing apparatuses 1 which are in a waiting state. Because the operation screen of an image processing apparatus 1 is set to the initial state when a remote operation is performed, it is desirable to select an image processing apparatus 1 in a waiting state.

The present invention is not limited to the above embodiment, and it is, of course, possible to make a lot of modifications and changes in the above embodiment. The remote access apparatus may be an image processing apparatus. In this case, the image processing apparatus which performs a remote operation does not have to acquire the screen data of the operation screens of image processing apparatuses having the same operation screen. It only has to acquire screen data from image processing apparatuses having different operation screens.

The remote access apparatus may display plurality of different operation screens at the same time with a multi-window. By operating each of the operation screens, a user can request output of a report from plurality of image processing apparatuses having different operation screens at a time.

What is claimed is:

1. A remote access system in which a plurality of image processing apparatuses for processing an image and a remote access apparatus for remotely operating the image processing apparatuses are connected via a network, and the remote access apparatus displays the same operation screen as the operation screens of the image processing apparatuses and remotely operates the image processing apparatuses on the basis of an operation on this operation screen;

wherein the remote access apparatus searches for image processing apparatuses which are in a waiting state and not operating from among the plurality of image processing apparatuses, selects one image processing apparatus from among the image processing apparatuses which are in a waiting state, accesses to the selected image processing apparatus, and clears an image memory thereof for saving image data, wherein the accessed image processing apparatus sets the operation screen to an initial status and transmit image data for displaying the operation screen to the remote access apparatus, wherein the remote access apparatus acquires a screen data for displaying an operation screen from the accessed image processing apparatus in a waiting state, saves the screen data in a screen memory, and displays an operation screen on the basis of the acquired screen data, and wherein the remote access apparatus, when a user performs an operation for output report on the operation screen, accesses the plurality of image processing apparatuses and requests output, and each image processing apparatus creates a report in response to the output request from the remote access apparatus.

2. The remote access system according to claim 1 wherein each image processing apparatus has a common operation screen.

3. The remote access system according to claim 2, wherein the image processing apparatuses transmit the reports to a specific storage destination in the network.

4. The remote access system according to claim 1, wherein the remote access apparatus determines image processing apparatuses from which the remote access apparatus requests output of reports this time, on the basis of the last time acquisition of reports.

5. The remote access system according to claim 1, wherein the remote access apparatus gives an event notification to each image processing apparatus in response to an operation on the operation screen, and each image processing apparatus performs the same processing on the basis of the event notification.

6. A remote access apparatus which is connected to a plurality of image processing apparatuses for processing an image via a network and which remotely operates the image processing apparatuses, the remote access apparatus comprising a display section for displaying the same operation screen as the operation screens of the image processing apparatuses, a remote control section for remotely operating the image processing apparatuses in response to an operation on this operation screen, and a screen memory for saving screen data;

wherein the remote control section searches for image processing apparatuses which are in a waiting state and not operating from among the plurality of image processing apparatuses, selects one image processing apparatus from among the image processing apparatuses which are in a waiting state and not operating, accesses to the selected image processing apparatus, clear an image memory thereof, acquires a screen data for displaying an operation screen in an initial state from the accessed image processing apparatus in a waiting state, and saves the screen data in a screen memory, wherein the display section displays an operation screen on the basis of the acquired screen data, and wherein the remote access apparatus, when a user performs an operation for output report on the operation screen, accesses the plurality of image processing apparatuses, and, requests output of a report from each image processing apparatus.

* * * * *